US012398053B2

(12) United States Patent
Gronfors et al.

(10) Patent No.: US 12,398,053 B2
(45) Date of Patent: Aug. 26, 2025

(54) METHOD OF MONITORING AND OPTIONALLY CONTROLLING REMOVAL OF MICROPLASTICS FROM MICROPLASTIC CONTAINING WATERS

(71) Applicant: Kemira Oyj, Helsinki (FI)

(72) Inventors: Outi Gronfors, Espoo (FI); Mehrdad Hesampour, Espoo (FI); Katriina Rajala, Espoo (FI); Lenita Lindberg, Espoo (FI)

(73) Assignee: Kemira Oyj, Helsinki (FI)

( * ) Notice: Subject to any disclaimer, the term of this patent is extended or adjusted under 35 U.S.C. 154(b) by 1029 days.

(21) Appl. No.: 17/430,776

(22) PCT Filed: Feb. 18, 2020

(86) PCT No.: PCT/EP2020/054223
§ 371 (c)(1),
(2) Date: Aug. 13, 2021

(87) PCT Pub. No.: WO2020/169595
PCT Pub. Date: Aug. 27, 2020

(65) Prior Publication Data
US 2022/0135452 A1    May 5, 2022

(30) Foreign Application Priority Data

Feb. 18, 2019  (SE) .................................. 1950204-6
May 6, 2019    (SE) .................................. 1950533-8

(51) Int. Cl.
*C02F 1/56*     (2023.01)
*C02F 1/52*     (2023.01)
*C02F 101/30*   (2006.01)

(52) U.S. Cl.
CPC .............. *C02F 1/56* (2013.01); *C02F 1/5209* (2013.01); *C02F 2101/30* (2013.01); *C02F 2209/105* (2013.01)

(58) Field of Classification Search
CPC ............. C02F 1/5209; C02F 2209/105; G01N 15/1459
See application file for complete search history.

(56) References Cited

U.S. PATENT DOCUMENTS

2021/0070638 A1*  3/2021  Herbort .................. C08L 83/04

FOREIGN PATENT DOCUMENTS

WO       20170168054       10/2017

OTHER PUBLICATIONS

Maes, Thomas, et al. "A rapid-screening approach to detect and quantify microplastics based on fluorescent tagging with Nile Red." Scientific reports 7.1 (2017): 44501. (Year: 2017).*

(Continued)

*Primary Examiner* — Bradley R Spies
(74) *Attorney, Agent, or Firm* — Robin L. Teskin; Baker, Donelson, Bearman, Caldwell & Berkowitz PC

(57) ABSTRACT

The present invention relates to a method of monitoring and optionally controlling removal of microplastics from microplastic containing raw water, drinking water, storm water, water originating from melted snow, surface water, effluent of industrial wastewater treatment plants, effluent of municipal wastewater treatment plants, industrial process water, using at least one coagulant and/or polymer, wherein the number of microplastic particles of the microplastic containing water before and/or after addition of said at least one coagulant and/or polymer is determined by using an optical measurement measuring light scattering and fluorescence of particles in a predetermined volume of the microplastic containing water.

14 Claims, 4 Drawing Sheets

(56) References Cited

OTHER PUBLICATIONS

Shim, Won Joon, et al. "Identification and quantification of microplastics using Nile Red staining." Marine pollution bulletin 113.1-2 (2016): 469-476. (Year: 2016).*

Long et al. "Interactions between polystyrene microplastics and marine phytoplankton lead to species-specific hetero-aggregation." Environmental Pollution. Sep. 1, 2017;228:454-63.

Ma et al. "Characteristics of microplastic removal via coagulation and ultrafiltration during drinking water treatment." Chemical Engineering Journal. Mar. 1, 2019;359:159-67.

* cited by examiner

METHOD OF MONITORING AND OPTIONALLY CONTROLLING REMOVAL OF MICROPLASTICS FROM MICROPLASTIC CONTAINING WATERS

RELATED APPLICATIONS

This application is a U.S. National Phase application of Int'l Appl. No. PCT/EP2020/054223, filed Feb. 18, 2020, which claims priority to Swedish Appl. No. 1950204-6, filed Feb. 18, 2019, and Swedish Appl. No. 1950533-8, filed May 6, 2019, each of which are incorporated herein by reference in their entireties.

FIELD OF THE INVENTION

The present invention relates to removal of microplastics from waters, such as wastewaters or surface waters.

BACKGROUND

There is a growing concern about microplastics in waters. Microplastics are defined as plastics of a particle size below 5 mm. The plastics may be different chemically, and physically, such as shape. The microplastics may also be classified based on origin, e.g. primary microplastics, and secondary microplastics. Primary microplastics are microplastics produced for an intended purpose, e.g. within cosmetics, where abrading beads for exfoliating purposes are added to shampoos, soaps, toothpastes, facial masks, etc. Secondary microplastics are microplastics formed by wear and physical degradation, e.g. of large plastic debris and synthetic textiles, such as degradation of car tyres and asphalt, and clothes when washing them. A single shower using microplastic containing cleaning compositions could result in 100 000 plastic particles entering the ocean. Thus, many countries are banning the use of microplastics for such purposes. However, a huge damage has already been done. The threat that poses to nature in terms of secondary microplastics.

Plastics are of concern due to their long life time, and low degree of chemical degradation in nature. Microplastics are found in waters, plants and wildlife today. Microplastics have been found present in remote locations including deep sea sediments and arctic sea ice. Thus, microplastics have entered the food chain. Microplastics, as other small sized particles, may be able to penetrate and/or be ingested, and accumulate in e.g. animals. Thus, predators on the top of the food chain, such as humans, are most sensitive to any effects of the microplastics. Their full effect on marine wildlife, humans, etc. is investigated but the full understanding thereof is still to be discovered.

The effluents of municipal wastewater treatment plants (WWTPs) are identified as one of the potential sources of microplastic contamination of flora and fauna.

Wastewater treatment plants generally involves two stages, called primary, and secondary treatment. Influent of a municipal WWTP may be black and grey waters.

A pre-treatment may be present which removes all materials that can be easily collected from the raw sewage or wastewater before they damage or clog any pumps and sewage lines of primary treatment apparatuses. Objects commonly removed during pretreatment include trash, tree limbs, leaves, branches, and other large objects. It includes screening to trap solid objects and may also include sedimentation by gravity to remove suspended solids.

The primary treatment is designed to remove grease, suspended and floating solids from raw sewage. This level is sometimes referred to as "mechanical treatment", although chemicals are often used to accelerate the sedimentation process. Primary treatment can reduce the biochemical oxygen demand (BOD) of the incoming wastewater by 20-30% and the total suspended solids (TSS) by some 50-60%. Primary treatment is usually the first stage of wastewater treatment. A separation step separates water and sludge. The sludge, primary sludge, obtained at the primary treatment, may be subjected to further treatment and reuse. The sludge may be composted, put on landfill, dewatered or dried to reduce the water content, and/or digested for methane production.

After the primary treatment, the wastewater is directed to a secondary treatment, which includes a biological treatment and removes the dissolved organic matter, phosphorus and nitrogen that escapes the primary treatment. This is achieved by microbes consuming the organic matter, and converting it to carbon dioxide, water, and energy for their own growth and reproduction. Secondary treatment may include a separation process ("secondary sedimentation") to remove the micro-organisms and more of the suspended solids from the treated water, as secondary sludge, prior to discharge or the tertiary treatment. More than 85% of the suspended solids and BOD can be removed by a well running plant with secondary treatment.

A tertiary treatment may sometimes be defined as anything more than primary and secondary treatment in order to allow release into a highly sensitive or fragile ecosystem (estuaries, low-flow rivers, coral reefs, etc.), or for reuse, e.g. as process water, or irrigation water. Treated water is sometimes disinfected chemically or physically (e.g. using UV, ozone, or chemically, e.g. by sodium hypochlorite or performic acid) prior to discharge into recipient or reuse. An example of a typical tertiary treatment process is the modification of a conventional secondary treatment plant to remove additional phosphorus and/or nitrogen.

It is reported by several research groups that removal rate of microplastics having a particle size larger than 10 μm is up to 85-99% in WWTP but due to the large water flow, the total amount of microplastic released via the effluent is very high, e.g. for a plant having an effluent flow of 260 000 m³/day with only 0.25 microplastic particles/l, the amount of microplastic in the effluent exiting the WWTP is 65 million microplastic particles/day. This is just from one wastewater plant. It is reported that existing treatment units in wastewater plants are not able to further remove the remaining microplastics. As shown, due to the large volumes of water treated, there still is a huge total amount of microplastics in the discharge.

Measurement of microplastics from WWTP effluent is very challenging as the concentration is low and the background noise (i.e. other compounds and particulates present in water) is high.

Today microplastics are normally measured by intensive pretreatment of water samples and visual inspection of sample with microscope. This method is limited to particles >20 μm. This method is laborious and time consuming and requires skilled persons to perform analysis.

Thus, there is an urgent need to limit the amounts of microplastics and improve removal of microplastics from e.g. waters of the world.

SUMMARY

The present invention relates to a way of reducing the amount of microplastics in waters. The present invention is defined in the appended claims. By reducing the amount of microplastics in waters, the distribution to and accumulation in the flora and fauna may be limited. It has surprisingly been found that addition of coagulants and/or polymers can remove microplastics, e.g. this may be used as a last treatment step before releasing the treated water to the recipients or to reuse, to further remove microplastics from the effluent. A water treatment plant may have one or more treatment steps, e.g. primary, secondary and tertiary treatment steps such as in industrial or municipal WWTPs. A water treatment plant may be a plant treating surface water, melted snow water, storm water, industrial process water, or raw water, or may be an industrial or municipal wastewater treatment plant. If the ingoing water of a water treatment plant is selected from e.g. surface water, storm water, raw water, drinking water, water originating from melted snow, effluent of industrial wastewater treatment plant, effluent of municipal wastewater treatment plant, industrial process water, or any combination thereof, the addition of coagulants and/or polymers and a separation step connected thereto, can remove microplastics in said water(s) as a last treatment step of the water treatment plant before releasing the treated water to the recipients, or to reuse the treated water for different purposes, or providing purified drinking water or process water. Said addition of coagulants and/or polymers and the separation step may be provided after a primary treatment of the water as a last treatment step of a water treatment plant. Said addition of coagulants and/or polymers and the separation step may be provided after a secondary treatment, following a primary treatment, of the water as a last treatment step of a water treatment plant. Said addition of coagulants and/or polymers and the separation step may be provided after a tertiary treatment, following a primary and secondary treatment, of the water as a last treatment step of a water treatment plant. Drinking water or process water may be provided by treating surface water, melted snow water, storm water, industrial process water, or raw water. The treatment of said surface water, melted snow water, storm water, industrial process water, or raw water may include fewer treatment steps than industrial or municipal WWTPs, as said waters may be considered less contaminated than wastewaters, and/or the treated waters thereof may have different purity requirements than wastewaters. Thus, the addition of coagulants and/or polymers and a separation step connected thereto, to remove microplastics in said surface water, melted snow water, storm water, industrial process water, or raw water is done as a last treatment step or may be done also earlier in the process than the last treatment step of the water treatment plants therefore before provision of a purified drinking water or process water. Such treated waters obtained from surface water, melted snow water, storm water, industrial process water, or raw water may alternatively be released to the recipients, or to reuse the treated water for different purposes. The present invention further relates to a method of measuring the amount of microplastic particles present in waters using optical measurement to measure light scattering intensity and fluorescence intensity of a sample. In an embodiment the measurement may be flow cytometry method. The flow cytometry method allows measurement of the number and size of microplastics (also called count) in an aqueous phase in a short time and with a very low sample amount (milliliter). The method is based on measurement of number (count) and size of particles/drops/colloids in water. In addition, fluorescence intensity is measured. As the microplastics population in a cytogram may be located by their typical combined light scattering intensity and fluorescence the outcome of the measurement may be linked to microplastic count. The measurement values obtained may then also be used to control the water treatment, due to the quick analysis. The output from the analysis can be used for adjustment of the chemicals in treatment process or adjusting the process conditions. The measurements may be used to control the addition of the coagulants and/or polymers of the present process. The results can also be used for quality control of outgoing treated water or effluent of a water treatment plant to assure microplastic removal. A water treatment plant treating at least one of surface water, storm water, raw water, water for drinking water, water originating from melted snow, effluent of industrial wastewater treatment plants, effluent of municipal wastewater treatment plants, industrial process water, or any combination thereof, may be monitored according to the present method, and optionally the addition of the coagulants and/or polymers may be controlled, but the outgoing water may also be controlled with the present method as a quality control of the outgoing water before releasing the treated water to the recipients, or to reuse, or use the treated water for different purposes. Measurements of the water before and/or after the present addition of coagulants and/or polymers and separation is done to reduce the amount of microplastics present in the outgoing treated water, and may be used to assure the water quality. The method can also be used to monitor optionally control a water treatment process for the production of drinking to assure microplastic removal of the drinking water.

SHORT DESCRIPTION OF THE DRAWINGS

DETAILED DESCRIPTION

Figure 1:
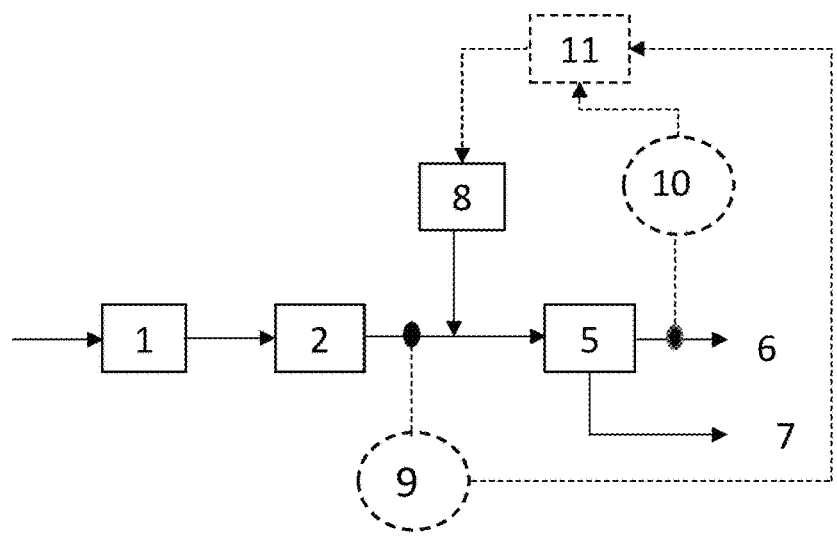
FIG. 1 shows a schematic drawing of a wastewater treatment process according to the invention.

The present invention relates to a method of monitoring, and optionally monitoring and optionally controlling removal, of microplastics from microplastic containing raw water, drinking water, storm water, water originating from melted snow, surface water, effluent of industrial wastewater treatment plants, effluent of municipal wastewater treatment plants, industrial process water. The present method may comprise the steps of:

the number of microplastic particles of the microplastic containing water may be determined by using an optical measurement measuring light scattering and fluorescence of particles in a predetermined volume of the microplastic containing water, by:

measuring the microplastic containing water, identifying particle populations measured which represents microplastics particle populations, determining the number of microplastic particles of the microplastic containing water.

The present method discloses monitoring and optionally controlling removal of microplastics from microplastic containing raw water, drinking water, storm water, water originating from melted snow, surface water, effluent of industrial wastewater treatment plants, effluent of municipal wastewater treatment plants, industrial process water. The present method comprises the steps of:

admixing at least one coagulant and/or polymer to the microplastic containing water, and allowing the at least one coagulant and/or polymer to interact with the microplastic containing water to form flocs and/or aggregates containing microplastic particles; and removing the formed flocs and/or aggregates in a separation process to provide treated water with decreased microplastic content;

wherein the number of microplastic particles of the microplastic containing water before and/or after addition of said at least one coagulant and/or polymer is determined by using an optical measurement measuring light scattering and fluorescence of particles in a predetermined volume of the microplastic containing water, by:

a) measuring the microplastic containing water before and/or after addition of said at least one coagulant and/or polymer, b) optionally measuring a reference sample comprising the microplastic containing water, before and/or after addition of said at least one coagulant and/or polymer, doped with predetermined microplastics, c) combining the measured light scattering intensities against fluorescence intensities of each measurement in a) and optionally b), d) identifying particle populations measured which represents microplastics particle populations, e) determining the number of microplastic particles of the microplastic containing water before and/or after addition of said at least one coagulant and/or polymer.

Preferably the step b) is included into the method.

The present invention relates to a method of monitoring and optionally controlling removal of microplastics from microplastic containing raw water, drinking water, storm water, water originating from melted snow, surface water, effluent of industrial wastewater treatment plants, effluent of municipal wastewater treatment plants, industrial process water. The present method comprises the steps of:

admixing at least one coagulant and/or polymer to the microplastic containing water, and allowing the at least one coagulant and/or polymer to interact with the microplastic containing water to form flocs and/or aggregates containing microplastic particles; and removing the formed flocs and/or aggregates in a separation process to provide treated water with decreased microplastic content;

wherein the number of microplastic particles of the microplastic containing water before and/or after addition of said at least one coagulant and/or polymer is determined by using an optical measurement measuring light scattering and fluorescence of particles in a predetermined volume of the microplastic containing water, by:

a) measuring the microplastic containing water before and/or after addition of said at least one coagulant and/or polymer, b) measuring a reference sample comprising the microplastic containing water, before and/or after addition of said at least one coagulant and/or polymer, doped with predetermined microplastics, c) combining the measured light scattering intensities against fluorescence intensities of each measurement in a) and b), d) identifying particle populations measured which represents microplastics particle populations, e) determining the number of microplastic particles of the microplastic containing water before and/or after addition of said at least one coagulant and/or polymer.

The step of identifying particle populations measured which represents microplastics particle populations includes identifying particle populations of the measured data representing microplastic particles populations based on predetermined identification data. The predefined identification data comprises at least one of:

comparing with reference data of scattering intensity and the fluorescence intensity of said known microplastic particles, and identifying an area of a plotted graph of the scattering intensity and the fluorescence intensity representing the microplastic particles populations; or comparing the scattering intensity and the fluorescence intensity data of microplastic particles of the microplastic containing water to be treated and the microplastic containing water to be treated doped with predetermined amount a known number of microplastic particles, which are measured by taking samples of the waters, doped and undoped with microplastic particles, and performing measurements with the optical measurement measuring light scattering and fluorescence of particles; or comparing the scattering intensity and the fluorescence intensity data of microplastic particles of a liquid matrix other than the microplastic containing water to be treated, and another sample of said microplastic containing water to be treated and introducing thereto a predetermined amount a known number of microplastics, by taking samples of the liquid matrices, doped and undoped with microplastic particles, and performing measurements with the optical measurement measuring light scattering and fluorescence of particles. The other liquid matrices used for the predefined identification data may be water or synthetic water. The amounts and types of microplastic particle used in the predefined identification data may be the same or different to the microplastic particles mentioned for the present process step b).

The number of microplastic particles may be measured before the addition of said at least one coagulant and/or polymer. The number of microplastic particles may be measured after the addition of said at least one coagulant and/or polymer. When measurement is made after the addition of said at least one coagulant and/or polymer, it is preferably made after the removal of the formed flocs and/or aggregates, i.e. measurement is made on the treated water with decreased microplastic content. The number of microplastic particles may be measured before and after the addition of said at least one coagulant and/or polymer. Preferably a measurement both before and after addition is made as that may provide a result of the reduction amount of the microplastic particles in the treated water. Also, the measurement of at least one position such as two positions, may be extended to include a control of the addition amount of said at least one coagulant and/or polymer.

The microplastic containing water may be industrial and/or municipal waters, such as effluents of wastewater treatment plants after secondary treatment, or tertiary treatments; preferably secondary treatments. The microplastic containing water to be treated according to the present method is preferably outgoing treated water of a water treatment plant, e.g. effluent from water treatment plants, i.e. the present process would be used after the conventional last treatment step of the water treatment plants before releasing the treated water to the recipients, or further use, or to reuse.

The at least one coagulant may be selected from inorganic coagulants.

The at least one inorganic coagulant may comprise iron containing salts, aluminium containing salts, magnesium containing salts, or any derivative thereof, preferably chlorides, sulphates, chlorosulphates, chlorohydrates, silicates, nitrates, and any derivate thereof. The inorganic coagulant may comprise aluminium sulfate, polyaluminium sulfate, aluminium chloride, polyaluminium chloride, polyaluminium chlorosulfate, polyaluminium hydroxychlorosulfate, aluminium chlorohydrate, sodium aluminate, ferric sulfate, polyferric sulfate, ferric chloride, ferric chlorosulphate, polyferric chloride, ferrous sulfate, ferrous chlorosulphate, ferrous chloride, aluminium triformate, polyaluminium formate, polyaluminium nitrate, polyaluminium silicate, magnesium chloride, any derivative thereof, and any combination thereof. The inorganic coagulant may comprise iron containing salts, aluminium containing salts, or any derivative thereof, preferably chlorides, sulphates, chlorosulphates, chlorohydrates, and any derivate thereof; more preferably aluminium sulfate, polyaluminium sulfate, aluminium chloride, polyaluminium chloride, polyaluminium chlorosulfate, polyaluminium hydroxychlorosulfate, aluminium chlorohydrate, ferric sulfate, polyferric sulfate, ferric chloride, ferric chlorosulphate, polyferric chloride, ferrous sulfate, ferrous chlorosulphate, ferrous chloride, any derivative thereof, and any combination thereof.

The at least one polymer may comprise anionic polymers, amphoteric polymer, cationic polymers, nonionic polymers, polysaccharides, polyphenolic compounds, and any combination thereof.

The polymer may comprise anionic polymer which may comprise polymers based on compounds selected from the group acrylamide (AMD), (2-acrylamido-2-methyl-1-propanesulfonic acid) (AMPS) and acrylic acid (AA) and any combination thereof; such as polymers based on the combination of acrylamide (AMD) and (2-acrylamido-2-methyl-1-propanesulfonic acid) (AMPS) and/or combination of acrylic acid (AA) and (2-acrylamido-2-methyl-1-propanesulfonic acid) (AMPS).

The polymer may comprise cationic polymer which may comprise cationic polyacrylamide, poly(diallyldimethylammonium chloride), polyamine, melamine-formaldehyde resin, polydicyandiamide, and any combination thereof.

The polymer may comprise nonionic polymer comprising polymers based on compounds comprising acrylamide (AMD).

The polysaccharides may be selected from the group cellulose, starch, chitin and chitosan compounds and any combination thereof. The polyphenolics may be selected from the group tannins, lignin and any combination thereof.

The polymer may comprise polyacrylamide, polyamine, polyDADMAC, any derivative thereof, or any combination thereof.

Said at least one coagulant and/or polymer may be selected from the group:
aluminium sulfate, polyaluminium sulfate, aluminium chloride, polyaluminium chloride, polyaluminium chlorosulfate, polyaluminium hydroxychlorosulfate, aluminium chlorohydrate, ferric sulfate, polyferric sulfate, ferric chloride, ferric chlorosulphate, polyferric chloride, ferrous sulfate, ferrous chlorosulphate, ferrous chloride;
anionic polymer comprising polymers based on compounds selected from the group acrylamide (AMD), (2-acrylamido-2-methyl-1-propanesulfonic acid) (AMPS) and acrylic acid (AA);
cationic polymer comprising polyacrylamide, poly(diallyldimethylammonium chloride), polyamine, melamine-formaldehyde resin, polydicyandiamide;
nonionic polymer comprising polymers based on compounds comprising acrylamide (AMD);
cellulose, starch, chitin and chitosan compounds;
tannins, and lignin; and
any combination thereof. Preferably, said at least one coagulant and/or polymer may be selected from the group polyaluminium sulfate, polyaluminium chloride, ferric sulfate, polyferric sulfate, ferric chloride, polyferric chloride, cationic polymer comprising polyamine, and any combination thereof.

The coagulant may be admixed in the amount to provide for a concentration of metal of the coagulant in the microplastic containing water of 0.01-1.5 mmol/l, preferably 0.05-1.2 mmol/l, preferably 0.05-1 mmol/l, preferably 0.1-0.9 mmol/l, preferably 0.1-0.8 mmol/l, preferably 0.2-0.6 mmol/l, preferably 0.3-0.5 mmol/l.

Coagulants are preferably used at pH between about 4.5 to 7.7.

Iron and aluminium coagulants may provide improved efficiency of MP removal or small amount of the coagulant needed, when used at pH<7, e.g. pH 4.5. to less than 7, pH 5 to less than 7, preferably pH 5 to 6.9, or pH 5.0 to 6.5, or pH 5.5 to 6.2, compared to when used at pH 7 or more, e.g. compared to pH 7.0 to 7.3.

Basicity of polyaluminiumchloride may have influence on MP removal. In some embodiments, one or more poly aluminium coagulants (PAC) may comprise 25%-45% basicity (i.e., OH/Al ratio of about 0.75 to about 1.35). In some embodiments, PAC coagulants may comprise up to about 70% basicity (i.e., an OH/Al ratio of about 2.10).

In some embodiments, one or more PACl-based coagulants for use in the methods described herein may comprise from about 0.1% or less to about 85% or more basicity (e.g., an OH/Al ratio of about 2.55) or more. In some embodiments, one or more PACl-based coagulants for use in the methods described herein may comprise 0% basicity The amount of active polymer, i.e. amount of polymer in terms of actives or active material (excluding non-active parts like water of a polymer containing product) meaning amount of polymer in dry form, i.e. calculated as dry solids, added to the waters may be about 0.00001-40 wt %, preferably 0.00005-40 wt %, preferably 0.00005-20 wt %, most preferably 0.00005-0.6 wt %. The amount of active polymer added to the waters may be about 0-50 mg/l, preferably 0.1-50 mg/l, preferably 1-50 mg/l, preferably 5-50 mg/l, preferably 10-45 mg/l, most preferably 10-25 mg/l.

The present method may further comprise addition of an additive comprising iron containing salts, aluminium containing salts, or magnesium containing salts comprising hydroxides and/or oxides, preferably ferric hydroxide, ferrous hydroxide, magnesium oxide, magnesium hydroxide.

The separation of the formed flocs and/or aggregates from the microplastic containing water and/or substantially purified water may be performed by any one of sedimentation, filtration, flotation, froth flotation, dissolved air flotation, or any combination thereof. The separation of the formed flocs and/or aggregates may be performed using a centrifugation device, filtration device, flotation device, dissolved air flotation device, froth flotation device, sedimentation device, or any combination thereof, such as a centrifuge, hydrocyclone, filter press, belt filter, vacuum filter, disk filter, dissolved air flotation device, froth flotation device, decanter, or any combination thereof.

The method may further include a concentration step before addition of said at least one coagulant and/or polymer to remove water and concentrate the water to be treated with said at least one coagulant and/or polymer. As the waters to be treated may have a very low number of microplastic particles removal a part of the water content of the flow provides a microplastic particle concentrated water flow to be treated with the coagulant and/or polymer. Higher amount of particles provides easier monitoring and optional control of the present process. Thus, the concentration provides a step of water separation in order to concentrate the water to be treated with said at least one coagulant and/or polymer. The concentration step may be performed by any one of filtration including membrane filtration such as microfiltration, ultrafiltration, nanofiltration and reverse osmosis, and/or centrifugation; preferably using a filter press, belt filter, disk filter, vacuum filter, and/or centrifuge.

The microplastics present in the waters may comprise polyethylene, polypropylene, polyvinylchloride, polyurethane, polystyrene, polyamide, polyester, acrylonitrile butadiene styrene, polytetrafluoroethylene, cellulose acetate, polycarbonate, polymethylmethacrylate, polyethylene terephthalate, polyvinylidene chloride, phenol formaldehyde, melamine formaldehyde and any derivative thereof.

The size of the microplastic particles may be 0.1-100 μm, such as 0.1-50 μm, 1-50 μm, 5-100 μm, 5-50 μm, 6-100 μm, 5-20 μm, 6-50 μm, or 6-30 μm.

The microplastic content or number after the present treatment may be decreased to an amount below present detection limits. This would give an appearance that there are no microplastics present after the present treatment.

The present optical measurement may include a selection of type of light scattering and fluorescence channel.

The present optical measurement measuring light scattering and fluorescence of particles may measure forward and/or side scattering. The scattering may then be used to determine an area of plotting symbolizing the microplastic particles.

The present optical measurement measuring light scattering and fluorescence of particles may further provide a determination of the microplastic particles' sizes, and/or amount of particles of the same size (also referred to a density of a plotted area).

If the measurement of number of microplastic particles in the water is done in more than one position multiple optical measurement devices may be used, or one optical measurement device may be used for analysis of all measurement positions.

The optical measurement may be a flow cytometry measurement. The count of microplastic particles in a predetermined volume sample may be performed using the flow cytometry method.

The flow cytometry method may include particle identification, particle classification, particle size determination, particle size distribution, particle count quantification, or any combination thereof.

The predetermined sample volume of the optical measurement may be about 1 ml, of which 200 μl may be used for the analysis.

The microplastic containing water or treated water, prior to the optical measurement, e.g. measuring the count of microplastic particles, may be provided with a fluorescent dye for selective staining of the microplastics. The microplastics have a hydrophobic surface. A dye may be used for easier detection of the microplastic particles. Preferably a dye to be used is attracted to hydrophobic surfaces. The fluorescent dye may be a lipophilic stain, such as Nile Red, Rose Bengal, Oil red EGN, Eosin B, Hostasol Yellow 3G, a BODIPY green dye, any derivative, or combination thereof.

The present method may also be used to control the removal of microplastics. The addition amount of said at least one coagulant and/or polymer may be controlled in relation to a predetermined reference input value. The predetermined reference input value may be set to reflect a certain measured value of the number of microplastic particles. The addition amount of said at least one coagulant and/or polymer may be controlled in relation to the reduction in number of microplastic particles and a predetermined reference input value set to reflect a certain measured decrease of the number of microplastic particles.

A control unit may be used to control the addition amount of said at least one coagulant and/or polymer based on measured data and preset data. The control unit may have a database, a file, a data processor for receiving measured data and converting the received data on light scattering intensities and fluorescence intensities before and/or after addition of said at least one coagulant and/or polymer, and correlate with at least said predetermined reference input value to control an increased, decreased, or maintained addition amount of said at least one coagulant and/or polymer to the process. The predetermined reference input value may be a defined specific number or range. When the measured data exceed or fall below a predetermined reference input value an increase or decrease of the addition amount of said at least one coagulant and/or polymer to the process is made.

FIG. 1 shows a wastewater treatment process, wherein water to be treated enters a primary treatment step 1. Before the primary treatment step the waters to be treated may have been subjected to a pretreatment step (not shown). The primary treated wastewater is forwarded to a secondary treatment step 2. After the secondary treatment step 2 purified water is obtained, which contains the amounts of microplastics discussed herein needing to be reduced. The purified water from secondary treatment step 2 is subjected to addition of coagulant and/or polymer 8 and allowed to interact with the microplastics present in the water. A separation step 5 is performed. Final purified water 6 without microplastics or reduced amount of microplastics is provided. Any amount of microplastics present in the final purified water 6 is preferably at a level lower than what is presently measurable with currently available technology. Final purified water 6 may then be reused e.g. as process water, or discharged into the environment, such as surface waters, e.g. lakes, or sea, or used in agriculture. Solids in the form of sludge are removed and provided as a stream 7.

The amount of microplastic present may be measured using a flow cytometry measuring device 9 and/or 10. It is to be noted that the flow cytometry measuring device 9 and/or 10 may be one and the same device measuring both position points. The amount of microplastics leaving the secondary treatment step and before the coagulant and/or polymer addition 8 may be measured alone using a flow cytometry measuring device 9. The measurement may be used as input for the coagulant and/or polymer addition 8, which may be controlled via a controlling device 11 connected to the flow cytometry measuring device 9. In a similar manner, the amount of microplastics leaving as final purified water 6 after the coagulant and/or polymer addition 8 and separation 5 may be measured alone using a flow cytometry measuring device 10. The measurement may be used as input for the coagulant and/or polymer addition 8, which may be controlled via a controlling device 11 connected to the flow cytometry measuring device 10. The flow cytometry measuring devices 9 and 10 may be used in combination and together with controlling device 11 use as input for the coagulant and/or polymer addition 8.

Figure 2:
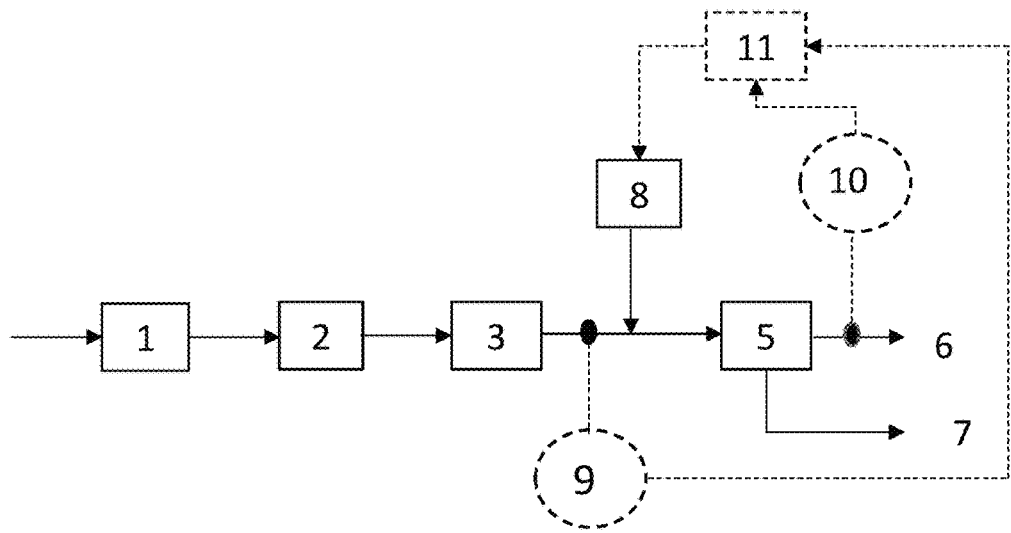
FIG. 2 shows a schematic drawing of a wastewater treatment process according to the invention.

FIG. 2 discloses a similar wastewater treatment process to FIG. 1 but with an additional tertiary treatment step 3 present in the process. Water to be treated enters a primary treatment step 1. Before the primary treatment step the waters to be treated may have been subjected to a pretreatment step (not shown). The primary treated wastewater is forwarded to a secondary treatment step 2. The secondary treated wastewater is forwarded to a tertiary treatment step 3. After the tertiary treatment step 3 purified water is obtained, which contains the amounts of microplastics discussed herein needing to be reduced. The purified water from tertiary treatment step 3 is subjected to addition of coagulant and/or polymer 8 and allowed to interact with the microplastics present in the water. A separation step 5 is performed. Final purified water 6 without microplastics or reduced amount of microplastics is provided. Any amount of microplastics present in the final purified water 6 is preferably at a level lower than what is presently measurable with currently available technology. Final purified water 6 may then be reused e.g. as process water, or discharged into the environment, such as surface waters, e.g. lakes, or sea, or used in agriculture. Solids in the form of sludge are removed and provided as a stream 7.

The amount of microplastic present may be measured using a flow cytometry measuring device 9 and/or 10. It is to be noted that the flow cytometry measuring device 9 and/or 10 may be one and the same device measuring both position points. The amount of microplastics leaving the tertiary treatment step and before the coagulant and/or polymer addition 8 may be measured alone using a flow cytometry measuring device 9. The measurement may be used as input for the coagulant and/or polymer addition 8, which may be controlled via a controlling device 11 connected to the flow cytometry measuring device 9. In a similar manner, the amount of microplastics leaving as final purified water 6 after the coagulant and/or polymer addition 8 and separation 5 may be measured alone using a flow cytometry measuring device 10. The measurement may be used as input for the coagulant and/or polymer addition 8, which may be controlled via a controlling device 11 connected to the flow cytometry measuring device 10. The flow cytometry measuring devices 9 and 10 may be used in combination and together with controlling device 11 use as input for the coagulant and/or polymer addition 8.

Figure 3:
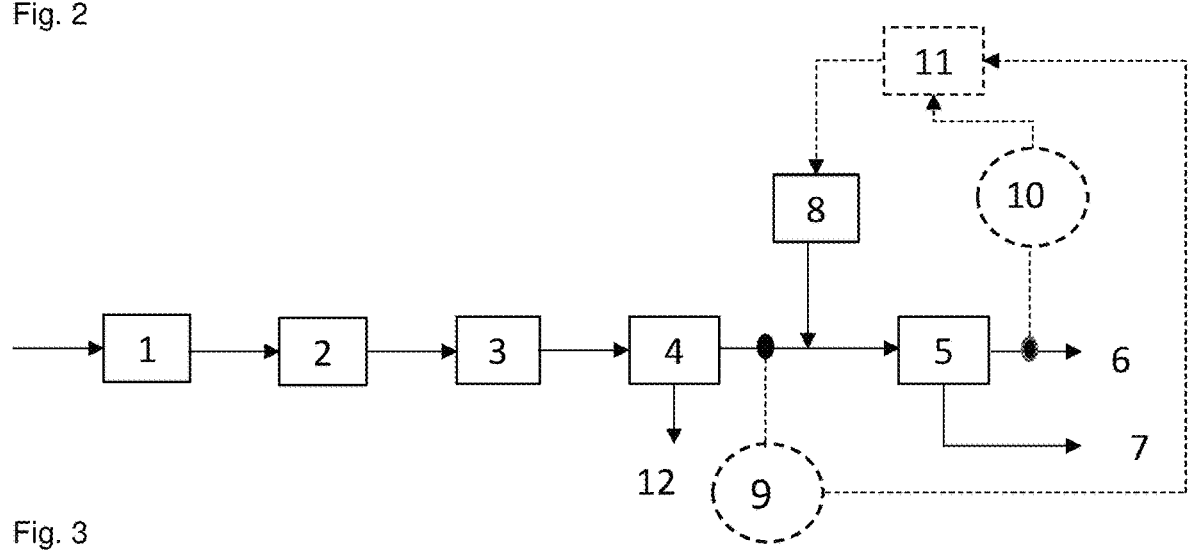
FIG. 3 shows a schematic drawing of a wastewater treatment process according to the invention.

FIG. 3 discloses a similar wastewater treatment process to FIG. 1 and FIG. 2, but with an additional separation step 4 to further concentrate waters in view of microplastic particle content. Such a separation and concentration step 4 could also be included directly after the secondary treatment step 2 if no tertiary treatment in present in the process. Water to be treated enters a primary treatment step 1. Before the primary treatment step the waters to be treated may have been subjected to a pretreatment step (not shown). The primary treated wastewater is forwarded to a secondary treatment step 2. The secondary treated wastewater is forwarded to a tertiary treatment step 3. After the tertiary treatment step 3 purified water is obtained, which contains the amounts of microplastics discussed herein needing to be reduced. The purified water from tertiary treatment step 3 is then subjected to a separation step 4 to remove water 12, i.e. concentrating the microplastic containing water. The concentrated purified microplastic containing water is then subjected to addition of coagulant and/or polymer 8 and allowed to interact with the microplastics present in the water. A separation step 5 is performed. Final purified water 6 without microplastics or reduced amount of microplastics is provided. Any amount of microplastics present in the final purified water 6 is preferably at a level lower than what is presently measurable with currently available technology. Final purified water 6 may then be discharged for further use or into the environment, as stated above. Solids in the form of sludge are removed and provided as a stream 7.

The amount of microplastic present may be measured using a flow cytometry measuring device 9 and/or 10. It is to be noted that the flow cytometry measuring device 9 and/or 10 may be one and the same device measuring both position points. The amount of microplastics leaving the tertiary treatment step after the first separation step 4, and before the coagulant and/or polymer addition 8 may be measured alone using a flow cytometry measuring device 9. The measurement may be used as input for the coagulant and/or polymer addition 8, which may be controlled via a controlling device 11 connected to the flow cytometry measuring device 9. In a similar manner, the amount of microplastics leaving as final purified water 6 after the coagulant and/or polymer addition 8 and both separations 4 and 5 may be measured alone using the using a flow cytometry measuring device 10. The measurement may be used as input for the coagulant and/or polymer addition 8, which may be controlled via a controlling device 11 connected to the flow cytometry measuring device 10. The flow cytometry measuring devices 9 and 10 may be used in combination and together with controlling device 11 use as input for the coagulant and/or polymer addition 8.

Figure 4:
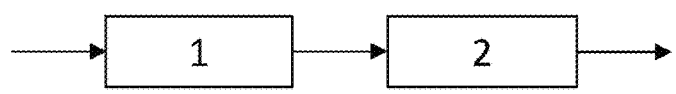
FIG. 4 shows a schematic drawing of a conventional wastewater treatment process.

FIG. 4 discloses a conventional wastewater treatment, wherein water to be treated enters a primary treatment step 1. Before the primary treatment step the waters to be treated may have been subjected to a pretreatment step (not shown). The primary treated wastewater is forwarded to a secondary treatment step 2. After the secondary treatment step 2 purified water is obtained. Purified water from the secondary treatment step 2 may then be forwarded as drinking water or discharged into the environment.

EXAMPLES

Materials

The following coagulants and flocculants were used in the coagulation and flocculation experiments:

Ferric chloride (13.8% Fe, density 1.42 kg/dm3)
Ferric sulphate (11.4% Fe, density 1.50 kg/dm3)
Polyaluminium chloride (9.3% Al, density 1.39 kg/dm3)
Polymer (polyamine Kemira SuperFloc C-577) (total solids content 49-52%)

The chemical dosages are presented as dosed metal amount in millimoles per liter, mmol Me/L, where Me corresponds to Fe-dosage when ferric chloride or ferric sulphate was used and Al-dosage when polyaluminium chloride was used.

The polymer was used as 1.0% solution.

The following microplastic particles were used in the experiments, unless otherwise stated:

MP1: 1 µm polystyrene, red fluorescent, 1% TS ThermoFisher, Catalogue number R0100

MP3: 6 µm (6.28 µm reported in bottle) polystyrene, yellow, 2.6% TS, PolyScience, Catalogue number 15716-5

MP4: 10 µm (9.9 mm reported in bottle) polystyrene, violet, 2.7% TS, PolyScience, Catalogue number, 18139-2

MP5: 15 µm (15.4 µm reported in bottle) polystyrene, 2.6% TS, PolyScience, Catalogue number, 18328-5

1 M NaOH and 1 M HCl were used for pH adjustment.

The experiments were monitored using flow cytometry (Sysmex-Partec CyFlow SL). Different kinds of results were calculated from the flow cytograms:

all the measured counts in the flow cytogram, are called "Counts (all)" including all counts created by all the particles in the sample counts that appear in a selected area of the flow cytogram, in an area called MP gate, are called "Counts (MP gate)". MP gate is an area in the flow cytogram that is sensitive to microplastic particles and their amounts in the sample.

counts that are created due to the chemical treatment that creates other particles than microplastic particles at MP gate, are called "Disturbing counts (MP gate)". These counts are measured when carrying out the actual chemical treatment without having any added microplastic particles in the solution. These counts show the disturbance from the treatment itself on the result.

counts of particles having a certain particle size, can be detected. In the examples, counts in the MP gate having a particle size above 3.0 µm have been calculated and are called "Counts >3.0 µm (MP gate)", and similarly, "Counts <1.0 µm (all)" represent the counts of particles with a size of less than 1.0 µm in the whole flow cytogram, and "Counts <0.45 µm (all)" represent the counts of particles with size of less than 0.45 µm in the whole flow cytogram.

The unit in presented counts is counts/mL.

The unit MP/L means microplastic particles in a litre.

From the results, microplastics removal efficiency was calculated as follows:

$$(Counts\ (MP\ gate)_{Zero} - Counts\ (MP\ gate)_{Treatment}) / (Counts\ (MP\ gate)_{Zero}) \times 100\%,$$

where Zero is a sample treated similarly than other samples but without chemical.

Example 1. Measurement of Water Samples Using Flow Cytometry a) Secondary Effluent from a Wastewater Treatment Plant A flow cytogram of the secondary effluent from a wastewater treatment plant is presented in FIG. 5. The grey area in the flow cytogram is an example of a selected measurement area for microplastic particles, called MP gate. From FIG. 5 it is seen that only very few particles from the sample appear in the grey area and the majority of the particles are on the left-hand side of it. The particles outside the grey area are not counted in the results of the grey area. From FIG. 5, it is clear that the measured solution does not contain any (almost at all) particles that would appear in the selected region of the MP gate.

Figure 5:
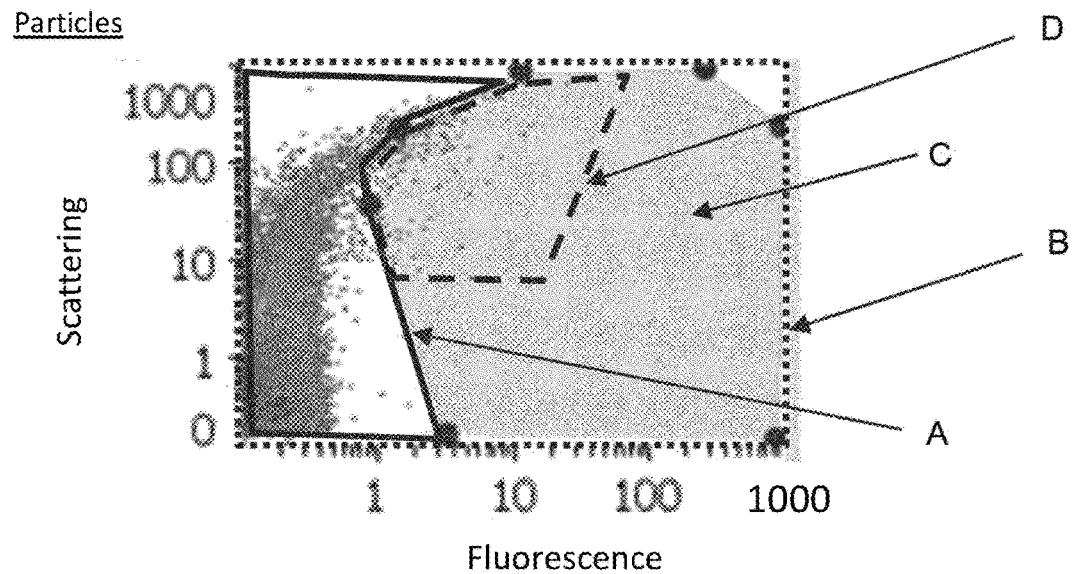
FIG. 5 shows a flow cytogram of secondary wastewater effluent without added microplastic particles.

FIG. 5 shows a flow cytogram of secondary wastewater effluent without added microplastic particles. The black solid line shows the area where most of the particles from the effluent give a signal in the flow cytogram, see to the left of the graph—A. The rectangular area with small square dashed line shows the area of the whole flow cytogram. All the measured particles are measured in this area, see the outer sides of the graph—B. MP gate, shown as the grey area, i.e. the area enclosed by the larger dots of the graph— C. Microplastic particles are measured in a selected MP gate. The dashed line shows an area, where some disturbing signals from the secondary wastewater effluent are measured in the MP gate, see the upper left corner of the MP gate—D.

Figure 6:
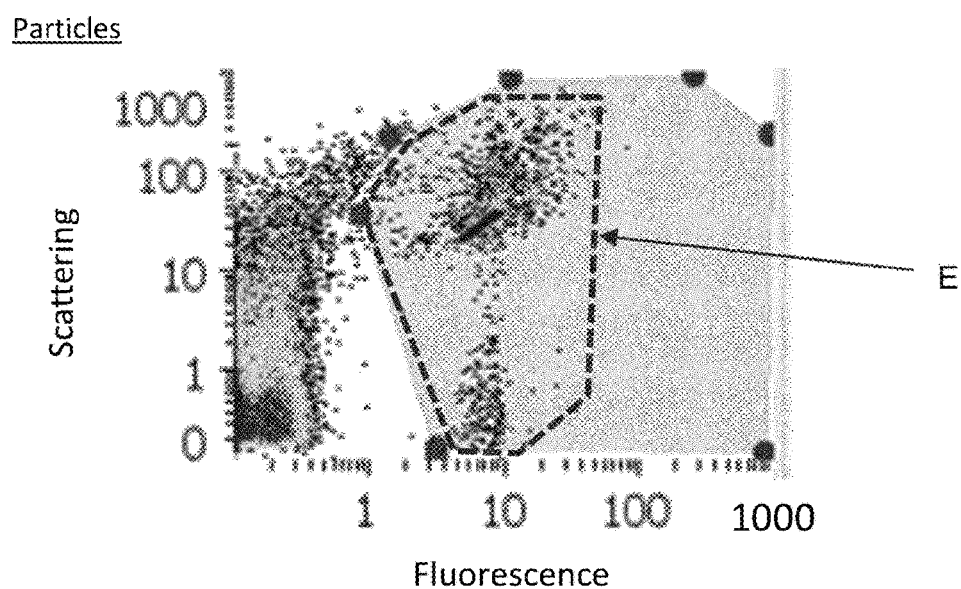
FIG. 6 shows an example of a flow cytogram showing an area where most of the MP3 microplastic particles give a signal.

FIG. 6 shows a measurement of a secondary effluent from a wastewater treatment plant with added microplastic particles MP3. It is seen that MP3 appears in a different area, in the MP gate, of a flow cytogram than the particles from the effluent, and the particle counts created by MP3 can be measured.

FIG. 6 shows an example of a flow cytogram showing an area where most of the MP3 microplastic particles give a signal, see area within dashed line—E.

For the flow cytogram measurements, a sample of 0.5 ml was taken, into which 0.5 ml of ultrapure water (Millipore, Milli-Q, Q-POD) was added into flow cytometry test tubes, and thereafter the sample was measured using flow cytometry. The sample of MP3 containing secondary wastewater effluent was taken while stirring.

Figure 7:
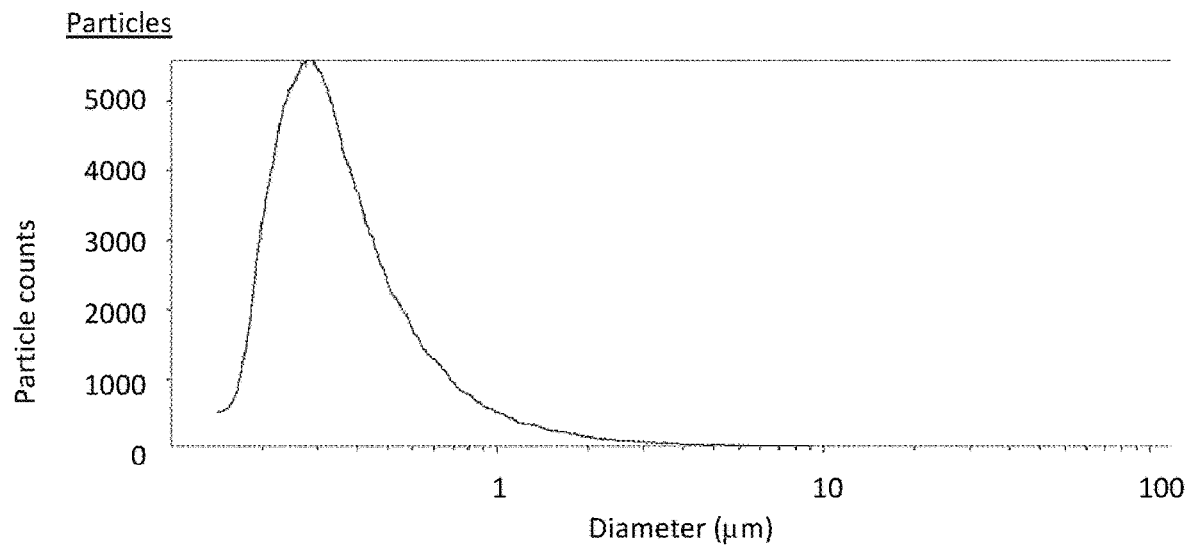
FIG. 7 shows the measured particle size of secondary wastewater effluent when using Counts (all).

FIG. 7 shows the measured particle size distribution of the secondary wastewater effluent in the flow cytogram when calculating Counts (all). No microplastic particles were added into this sample. It can be seen that the majority of the particles are less than 1 µm in size.

The measured counts are presented in Table 1. The secondary wastewater effluent did not contain any added microplastic particles, and therefore the Counts (MP gate) are very low, only 0.06% of the Counts (all). The counts >3.0 µm (MP gate) are even less, only 0.05% of the Counts (all). This means that the secondary wastewater effluent itself gives very minor disturbance and influence in the counts at the selected MP gate.

TABLE 1

The measured results of secondary wastewater effluent in the whole flow cytogram and in the MP gate.

| Water | Counts (all) | Counts <1.0 µm (all) | Counts <0.45 µm (all) | Counts (MP gate) | Counts >3.0 µm (MP gate) |
|---|---|---|---|---|---|
| Secondary wastewater effluent | 1553200 | 1500560 | 1315180 | 860 | 800 |

Figure 8:
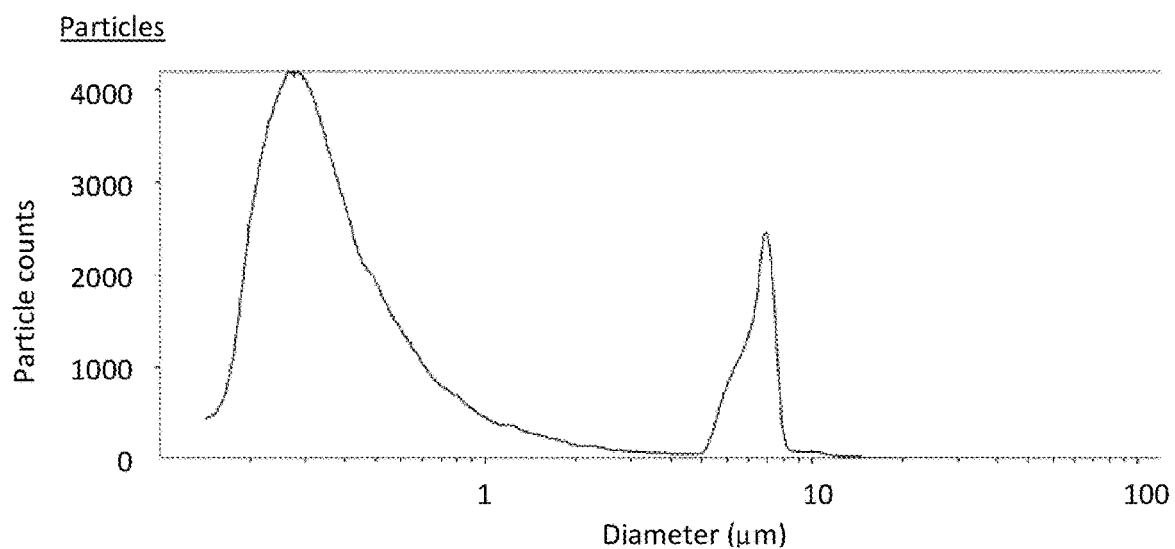
FIG. 8 shows the measured particle size of secondary wastewater effluent when using Counts (all) and with added MP3.

Furthermore, as presented in Table 1, when looking at the share of counts originating from particles having a particle size lower than 1.0 µm (Counts <1.0 µm (all)) in secondary wastewater effluent, these particles represent 97% of all counts of the flow cytogram (Counts (all)). Similarly, the share of counts originating from particles having lower particle size than 0.45 µm (Counts <0.45 µm (all)), still represent 85% of all counts of the flow cytogram (Counts (all)). Therefore, in the whole flow cytogram, the larger particles than what is present in the effluent, can be measured and distinguished from the secondary wastewater effluent, even without using the MP gate. This is illustrated in FIG. 8 with a secondary wastewater effluent that contained MP3.

b) Other Water Samples

Other water samples were also measured using flow cytometry: lake water and samples called Matrix 1a and Matrix 2a.

Preparation of Matrix 1a: 500 mL of ultrapure water (Millipore, Milli-Q, Q-POD) was taken using a measuring glass and poured into a 10 L bucket. Then, 0.13 g of CH3COONa and 0.22 g of NaHCO3 were dissolved into 500 mL of ultrapure water in a beaker and poured into the bucket. Finally, 9000 mL of ultrapure water was added using 500 mL and 2000 mL measuring glasses. For flow cytometry analysis, a sample of 1 ml was taken and measured using flow cytometry.

Preparation of Matrix 2a: 500 mL of ultrapure water (Millipore, Milli-Q, Q-POD) was taken using a measuring glass and poured into a 10 L bucket. Then, 0.13 g of CH3COONa and 0.22 g of NaHCO$_3$ were dissolved into 500 mL of ultrapure water in a beaker and poured into the bucket. Then, 0.3314 g of Humic acid (HA) was weighed into a beaker, 1.6 mL of 1 mol/L NaOH and approximately 300 mL of ultrapure water were added. The solution was mixed using a magnetic stirrer. After mixing well, this HA solution was poured into a volumetric flask and diluted to 1000 mL and added to the bucket. Finally, 8000 mL of ultrapure water was added to the bucket using 2000 ml measuring glasses. For flow cytometry analysis, a sample of 0.5 ml was taken, into which 0.5 ml of ultrapure water (Millipore, Milli-Q, Q-POD) was added into flow cytometry test tubes, and thereafter the sample was measured using flow cytometry.

In the case of lake water, a sample of 1 ml was taken and measured using flow cytometry.

The results are presented in the Table 2.

TABLE 2

The measured results of other water samples.

| Water | Counts (all) | Counts <1.0 μm (all) | Counts <0.45 μm (all) | Counts (MP gate) | Counts >3.0 μm (MP gate) |
|---|---|---|---|---|---|
| Matrix 1a | 48220 | 47900 | 46385 | 0 | 0 |
| Matrix 2a | 1368360 | 1056990 | 519550 | 1400 | 1080 |
| Lake water | 585860 | 476970 | 268260 | 1210 | 630 |

Similarly, as was the case with secondary wastewater effluent, other water samples caused only very low counts at the selected MP gates.

Example 2. Measurement of MP1, MP3, MP4 and MP5 in Secondary Wastewater Effluent Using Flow Cytometry Several different solutions containing microplastic particles were prepared and measured using a flow cytometry.

a) Measurement of MP1 Particles

MP1 was poured into a small beaker. From this beaker, 495 μL of the product was pipetted into a small beaker containing ultrapure water, and the pipette tip was flushed a few times. Then, this solution was poured into a 50-mL volumetric flask that was filled to the mark with ultrapure water (Millipore, Milli-Q, Q-POD). This solution was then poured into a sealable bottle to allow for pipetting under magnetic stirrer (during magnetic stirring). A magnet was added into the bottle, the bottle was placed on the magnetic stirrer and such a stirring was turned on that allowed the overall solution to mix homogeneously with a small vortex. While stirring, 20 mL of this solution was pipetted into another sealable bottle containing 980 mL of ultrapure water, measured by (with) measuring glass, and the pipette tip was flushed a few times.

The first sample (Table 3), was prepared pipetting 5289 μL of this solution to the 100-mL volumetric flask, 28 μL of 1 mol/L HCl was added, and the bottle was filled to the mark with secondary wastewater treatment plant effluent water. Other samples were prepared pipetting, depending on the desired microplastic amount in the sample, 26-3967 μL of the solution to a sealable bottle, and 28 μL of 1 mol/L HCl was added. Then, depending on the desired microplastic amount in the sample, 1033-4974 μL of ultrapure water was pipetted to the bottle. Finally, 95 mL of effluent was added. The details of sample preparation for each sample are shown in Table 3.

A sample of 0.5 ml was taken, into which 0.5 ml of ultrapure water (Millipore, Milli-Q, Q-POD) was added into flow cytometry test tubes, and thereafter the sample was measured using flow cytometry. The measurement results are shown in Table 3.

TABLE 3

Volume of MP1 containing solution, ultrapure water and secondary wastewater effluent used in the sample preparation, and the measured counts at the selected MP gate.

| Volume MP1 containing solution, mL | Volume ultrapure water, mL | Volume effluent, mL | Comments | Counts (MP gate) |
|---|---|---|---|---|
| 5.289 | 0.000 | 94.71 | Use volumetric flask, and fill to the mark with effluent | 126897 |
| 3.967 | 1.033 | 95 | Measuring glass for effluent | 90215 |
| 2.644 | 2.356 | 95 | Measuring glass for effluent | 91075 |
| 1.322 | 3.678 | 95 | Measuring glass for effluent | 31973 |
| 0.793 | 4.207 | 95 | Measuring glass for effluent | 19907 |
| 0.397 | 4.603 | 95 | Measuring glass for effluent | 10397 |
| 0.212 | 4.788 | 95 | Measuring glass for effluent | 5577 |
| 0.106 | 4.894 | 95 | Measuring glass for effluent | 2690 |
| 0.026 | 4.974 | 95 | Measuring glass for effluent | 713 | b) Measurement of MP3 Particles

MP3 was poured into a small beaker. From this beaker, 47 μL of the product was pipetted into a small beaker containing effluent wastewater, and the pipette tip was flushed a few times. Then, this solution was poured into a 50-mL volumetric flask that was filled to the mark with secondary wastewater treatment plant effluent. This solution was then poured into a sealable bottle to allow for pipetting under magnetic stirrer (during magnetic stirring). A magnet was added into the bottle, the bottle was placed on the magnetic stirrer and such a stirring was turned on that allowed the overall solution to mix homogeneously with a small vortex. While stirring, a sample of 0.5 ml was taken, into which 0.5 ml of ultrapure water (Millipore, Milli-Q, Q-POD) was added into flow cytometry test tubes, and thereafter the sample was measured using flow cytometry.

So prepared sample was also diluted to lower concentrations using secondary wastewater effluent. These samples were measured similarly as the original sample described above. The response from Counts (MP gate) for MP3 is linear as a function of MP3 concentration in the samples. All the results are presented in Table 4.

c) Measurement of MP4 Particles

MP4 was poured into a small beaker. From this beaker, 178 μL of the product was pipetted into a small beaker containing effluent wastewater, and the pipette tip was flushed a few times. Then, this solution was poured into a 50-mL volumetric flask that was filled to the mark with secondary wastewater effluent. This solution was then poured into a sealable bottle to allow for pipetting under magnetic stirrer (during magnetic stirring). A magnet was added into the bottle, the bottle was placed on the magnetic stirrer and such a stirring was turned on that allowed the overall solution to mix homogeneously with a small vortex. While stirring, a sample of 0.5 ml was taken, into which 0.5 ml of ultrapure water (Millipore, Milli-Q, Q-POD) was added into flow cytometry test tubes, and thereafter the sample was measured using flow cytometry. The results are presented in Table 4.

d) Measurement of MP5 Particles

MP5 was poured into a small beaker. From this beaker, 695 μL of the product was pipetted into a small beaker containing effluent wastewater, and the pipette tip was flushed a few times. Then, this solution was poured into a 50-mL volumetric flask that was filled to the mark with secondary wastewater treatment plant effluent. This solution was then poured into a sealable bottle to allow for pipetting under magnetic stirrer (during magnetic stirring). A magnet was added into the bottle, the bottle was placed on the magnetic stirrer and such a stirring was turned on that allowed the overall solution to mix homogeneously with a small vortex. While stirring, a sample of 0.5 ml was taken, into which 0.5 ml of ultrapure water (Millipore, Milli-Q, Q-POD) was added into flow cytometry test tubes, and thereafter the sample was measured using flow cytometry. The results are presented in Table 4.

TABLE 4

Counts of different microplastic particles in secondary wastewater effluent at the selected MP gate.

| Microplastic particles used | Calculated concentration of microplastic particles, MP/L | Counts (MP gate) | Counts >3.0 μm (MP gate) |
|---|---|---|---|
| MP3 | 479 100 | 1290 | 1140 |
| MP3 | 958 200 | 1660 | 1470 |
| MP3 | 9 582 000 | 7060 | 6850 |
| MP3 | 18 110 000 | 12200 | 11850 |
| MP3 | 47 910 000 | 29530 | 29050 |
| MP3 | 181 100 000 | 124670 | 123070 |
| MP4 | — | 26260 | 25160 |
| MP5 | — | 128170 | 126640 |

The microplastic particle concentrations (MP/L) were calculated based on the particle diameter, particle material density (polystyrene density 1.04 g/cm$^3$), the solids content of the microplastics products, and known dilution of the microplastics products.

The presented results show that it is possible to measure microplastic particles using a flow cytometry.

Figure 9:
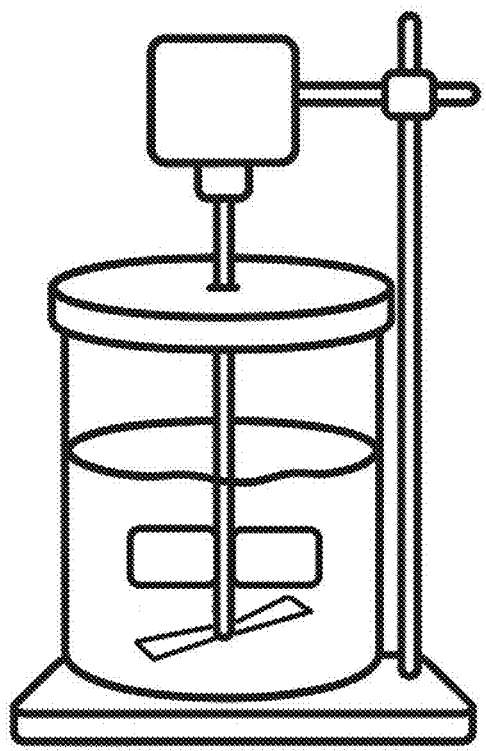
FIG. 9 shows the 1-L beaker and mixing device used in the coagulation and flocculation experiments.

Example 3. Removal of Microplastic from Water Matrices by Coagulation and Flocculation Using Polyaluminium Chloride, Ferric Chloride, Ferric Sulphate and Polyamine The experiments were carried out using 1 L beakers that were combined with Kemira flocculator that was used as a mixing device as shown in FIG. 9. Mixing parameters are shown in Table 5. In the experiments, first the fast mixing was turned on. Without any break, the fast mixing was followed by the slow mixing. Again, without any break, the settling period followed the slow mixing. The experiment ended in the end of the settling. The selected amounts of coagulant or flocculant, and pH adjustment chemical was dosed to the samples simultaneously in the beginning of the fast mixing. After the settling, approximately 0.1 L samples were taken for analysis using a glass pipette, 3 cm below the surface for analysis. The tip of the used glass pipette was cut to allow for also big flocs enter the pipette. Pipette was then emptied to a glass bottle by releasing the pipette filler.

In the case of Matrix 1 and lake water (Matrix 4), for flow cytometry analysis, a sample of 1 ml was taken and measured using flow cytometry.

In the case of Matrix 2 and secondary wastewater effluent (Matrix 3a-Matrix 3d), for flow cytometry analysis, a sample of 0.5 ml was taken, into which 0.5 ml of ultrapure water (Millipore, Milli-Q, Q-POD) was added into flow cytometry test tubes, and thereafter the sample was measured using flow cytometry.

When other than MP1 microplastic particle was used, the sample was taken while stirring. FIG. 9 shows the 1 L beaker and mixing device used in the coagulation and flocculation experiments.

TABLE 5

Mixing parameters used in experiments.

| Parameter | Speed, rpm | Time, min |
|---|---|---|
| Fast mixing | 400 | 0.5 |
| Slow mixing | 40 | 20 |
| Settling | 0 | 30 | rpm = rounds (revolutions) per minute.

a) Matrix 1

Preparation of Matrix 1: MP1 was poured into a small beaker. From this beaker, 495 μL of the product was pipetted into a small beaker containing ultrapure water, and the pipette tip was flushed a few times. Then, this solution was poured into a 50 mL volumetric flask that was filled to the mark with ultrapure water (Millipore, Milli-Q, Q-POD). This solution was then poured into a sealable bottle to allow for pipetting under magnetic stirrer (during magnetic stirring). A magnet was added into the bottle, the bottle was placed on the magnetic stirrer and such a stirring was turned on that allowed the overall solution to mix homogeneously with a small vortex. While stirring, 20 mL of this solution was pipetted into another sealable bottle containing 980 mL of ultrapure water, measured by (with) measuring glass, and the pipette tip was flushed a few times. Then, 500 mL of this solution was taken using a measuring glass and poured into a 10 L bucket. Then, 0.13 g of CH3COONa and 0.22 g of NaHCO$_3$ were dissolved into 500 mL of ultrapure water and poured into the bucket. Finally, 9000 mL of ultrapure water was added using 500 mL and 2000 mL measuring glasses.

1000 mL of so prepared solution was taken using a measuring glass and poured into 1 L beakers that were combined with Kemira flocculator as described above, and then used in the coagulation and flocculation experiments. pH was adjusted to 7.1-7.6 in the experiments.

The results of the experiments are shown in Table 6 and Table 7.

TABLE 6

The used chemicals, dosages and results in Matrix 1.

| Treatment, chemical | Chemical dose, mmol Me/L | Counts (all) | Counts (MP gate) | Microplastics removal % | Disturbing counts (MP gate) | Disturbing counts (MP gate)/Counts (MP gate), % |
|---|---|---|---|---|---|---|
| Zero | 0 | 187670 | 145787 | 0% | 0 | 0.0% |
| Ferric chloride | 0.02 | 266870 | 89530 | 39% | 155 | 0.2% |
| Ferric chloride | 0.04 | 248145 | 64110 | 56% | 285 | 0.4% |
| Ferric chloride | 0.07 | 264373 | 11967 | 92% | 35 | 0.3% |
| Ferric chloride | 0.25 | 122550 | 3065 | 98% | 35 | 1.1% |
| Ferric chloride | 0.37 | 107240 | 5945 | 96% | 20 | 0.3% |
| Polyaluminium chloride | 0.02 | 88220 | 37105 | 75% | 90 | 0.2% |
| Polyaluminium chloride | 0.05 | 57810 | 26525 | 82% | 230 | 0.9% |
| Polyaluminium chloride | 0.08 | 69420 | 8193 | 94% | 110 | 1.3% |
| Polyaluminium chloride | 0.25 | 48435 | 5135 | 96% | 125 | 2.4% |
| Polyaluminium chloride | 0.37 | 62040 | 4790 | 97% | 35 | 0.7% |

TABLE 7

The used chemical, dosages and results in Matrix 1.

| Treatment, chemical | Chemical dose, mg/L | Counts (all) | Counts (MP gate) | Microplastics removal % | Disturbing counts (MP gate) | Disturbing counts (MP gate)/Counts (MP gate), % |
|---|---|---|---|---|---|---|
| Zero | 0 | 187670 | 145787 | 0% | 0 | 0.00% |
| C-577 | 0.25 | 152733 | 90700 | 38% | 60 | 0.07% |
| C-577 | 0.5 | 133515 | 86060 | 41% | 75 | 0.09% |
| C-577 | 1 | 158000 | 111015 | 24% | 515 | 0.46% |
| C-577 | 2 | 136890 | 110295 | 24% | 50 | 0.05% |
| C-577 | 10 | 124035 | 101410 | 30% | 15 | 0.01% |
| C-577 | 20 | 130975 | 106690 | 27% | 385 | 0.36% | b) Matrix 2

Preparation of Matrix 2: MP1 was poured into a small beaker. From this beaker, 495 µL of the product was pipetted into a small beaker containing ultrapure water, and the pipette tip was flushed a few times. Then, this solution was poured into a 50-mL volumetric flask that was filled to the mark with ultrapure water (Millipore, Milli-Q, Q-POD). This solution was then poured into a sealable bottle to allow for pipetting under magnetic stirrer (during magnetic stirring). A magnet was added into the bottle, the bottle was placed on the magnetic stirrer and such a stirring was turned on that allowed the overall solution to mix homogeneously with a small vortex. While stirring, 20 mL of this solution was pipetted into another sealable bottle containing 980 mL of ultrapure water, measured by (with) measuring glass, and the pipette tip was flushed a few times. Then, 500 mL of this solution was taken using a measuring glass and poured into a 10-L bucket. Then, 0.13 g of CH3COONa and 0.22 g of NaHCO$_3$ were dissolved into 500 mL of ultrapure water and poured into the bucket. Humic acids (HA) were added to the solution. First, 0.3314 g of HA were weighed into a beaker, 1.6 mL of 1 mol/L NaOH and approximately 300 mL of ultrapure water were added. The solution was mixed using magnetic stirrer. After mixing well, this HA solution was poured into a volumetric flask and diluted to 1000 mL and added to the 10 L bucket. Finally, 8000 mL of ultrapure water was added to the bucket using 2000 ml measuring glasses.

1000 mL of so prepared solution was taken using a measuring glass and poured into 1 L beakers that were combined with Kemira flocculator as described above, and then used in the coagulation and flocculation experiments. pH was adjusted to 7.0-7.6 in the experiments. The results of the experiments are shown in Table 8 and Table 9.

TABLE 8

The used chemicals, dosages and results in Matrix 2.

| Treatment, chemical | Chemical dose, mmol Me/L | Counts (all) | Counts (MP gate) | Microplastics removal % | Disturbing counts (MP gate) | Disturbing counts (MP gate)/Counts (MP gate), % |
|---|---|---|---|---|---|---|
| Zero | 0 | 1527870 | 142990 | 0% | 1400 | 1% |
| Ferric chloride | 0.04 | 1572640 | 138440 | 3% | 1170 | 1% |
| Ferric chloride | 0.2 | 1788810 | 144480 | −1% | 1070 | 1% |

TABLE 8-continued

The used chemicals, dosages and results in Matrix 2.

| Treatment, chemical | Chemical dose, mmol Me/L | Counts (all) | Counts (MP gate) | Microplastics removal % | Disturbing counts (MP gate) | Disturbing counts (MP gate)/Counts (MP gate), % |
|---|---|---|---|---|---|---|
| Ferric chloride | 0.4 | 1593140 | 141970 | 1% | 1030 | 1% |
| Ferric chloride | 0.6 | 1589195 | 141285 | 1% | 1020 | 1% |
| Ferric chloride | 0.9 | 5848687 | 92567 | 35% | 130 | 0% |
| Ferric chloride | 1.1 | 1988950 | 36110 | 75% | 120 | 0% |
| Ferric chloride | 1.2 | 1153777 | 33970 | 76% | 380 | 1% |
| Ferric chloride | 1.4 | 883530 | 29710 | 79% | 60 | 0% |
| Polyaluminium chloride | 0.03 | 1591940 | 137440 | 4% | — | |
| Polyaluminium chloride | 0.2 | 1627770 | 143820 | −1% | — | |
| Polyaluminium chloride | 0.4 | 1441820 | 142880 | 0% | 60 | 0% |
| Polyaluminium chloride | 0.6 | 1211113 | 58373 | 59% | 445 | 1% |
| Polyaluminium chloride | 0.8 | 721935 | 37575 | 74% | 360 | 1% |
| Polyaluminium chloride | 0.9 | 234570 | 2770 | 98% | 1160 | 42% |
| Polyaluminium chloride | 1.1 | 264520 | 5000 | 97% | 800 | 16% |
| Polyaluminium chloride | 1.2 | 166233 | 2530 | 98% | — | |
| Polyaluminium chloride | 1.4 | 164140 | 2700 | 98% | 3400 | 126% |

TABLE 9

The used chemical, dosages and results in Matrix 2.

| Treatment, chemical | Chemical dose, mg/L | Counts (all) | Counts (MP gate) | Microplastics removal % | Disturbing counts (MP gate) | Disturbing counts (MP gate)/Counts (MP gate), % |
|---|---|---|---|---|---|---|
| Zero | 0 | 1527870 | 142990 | 0% | 1400 | 1.0% |
| C-577 | 43 | 1538130 | 147520 | −3% | — | |
| C-577 | 862 | 1505230 | 140340 | 2% | — | |
| C-577 | 1720 | 1609750 | 141410 | 1% | — | |
| C-577 | 2100 | 1621600 | 138070 | 3% | — | |
| C-577 | 2500 | 2864380 | 36590 | 74% | — | |
| C-577 | 3000 | 542400 | 19110 | 87% | 1100 | 5.8% |
| C-577 | 3050 | 603460 | 15020 | 89% | — | |
| C-577 | 3100 | 507070 | 20940 | 85% | — | |
| C-577 | 3150 | 732320 | 19830 | 86% | — | |
| C-577 | 3200 | 781240 | 23200 | 84% | 330 | 1.4% | c) Microplastics Containing Secondary Wastewater Effluent

Preparation of the First Batch of Microplastics Containing Secondary Wastewater Effluent, Matrix 3a:

MP1 was poured into a small beaker. From this beaker, 495 μL of the product was pipetted into a small beaker containing ultrapure water, and the pipette tip was flushed a few times. Then, this solution was poured into a 50 mL volumetric flask that was filled to the mark with ultrapure water (Millipore, Milli-Q, Q-POD). This solution was then poured into a sealable bottle to allow for pipetting (during magnetic stirring). A magnet was added into the bottle, the bottle was placed on the magnetic stirrer and a stirring that allowed the overall solution to mix homogeneously with a small vortex was turned on. While stirring, 20 mL of this solution was pipetted into another sealable bottle containing 980 mL of ultrapure water, measured by (with) measuring glass, and the pipette tip was flushed a few times. Then, 500 mL of this solution was taken using a measuring glass and poured into a 10 L bucket. Then, 9500 mL of secondary wastewater treatment plant effluent was taken using a measuring glass and was added to the bucket.

1000 mL of so prepared solution was taken using a measuring glass and poured into 1 L beakers that were combined with Kemira flocculator as described above, and then used in the coagulation and flocculation experiments. The pH was adjusted to 7.0-7.5 in the experiments.

The used chemicals, dosages and results of the experiments are shown in Table 10.

The used effluent properties were as follows:

COD=28.5-39.7 mg/L

Suspended solids=0.003-0.008 g/L

P-tot=0.189 mg/L

Dissolved PO4-P (0.45 μm filtrate)=<0.05 mg/L

UV absorbance (0.45 μm filtrate)=0.160

Color=23 PtCo

Turbidity=3.66-4.89 NTU

TABLE 10

The used chemicals, dosages and results in Matrix 3a.

| Treatment, chemical | Chemical dose, mmol Me/L | Counts (all) | Counts (MP gate) | Microplastics removal % | Disturbing counts (MP gate) | Disturbing counts (MP gate)/Counts (MP gate), % |
|---|---|---|---|---|---|---|
| Zero | 0 | 804278 | 108430 | 0% | 70 | 0.1% |
| Ferric chloride | 0.03 | 950490 | 92310 | 15% | 260 | 0.3% |
| Ferric chloride | 0.07 | 999380 | 80740 | 26% | 25 | 0.0% |
| Ferric chloride | 0.16 | 760470 | 43417 | 60% | 10 | 0.0% |
| Ferric chloride | 0.25 | 693075 | 18895 | 83% | 35 | 0.2% |
| Ferric chloride | 0.37 | 566470 | 3950 | 96% | 20 | 0.5% |
| Ferric chloride | 0.88 | 301170 | 590 | 99% | 0 | 0.0% |
| Ferric chloride | 1.23 | 347230 | 120 | 100% | 10 | 8.3% |
| Polyaluminium chloride | 0.03 | 788790 | 110860 | −2% | 40 | 0.0% |
| Polyaluminium chloride | 0.08 | 562695 | 47830 | 56% | 100 | 0.2% |
| Polyaluminium chloride | 0.16 | 447877 | 10387 | 90% | 20 | 0.2% |
| Polyaluminium chloride | 0.25 | 414150 | 6220 | 94% | 10 | 0.2% |
| Polyaluminium chloride | 0.37 | 336520 | 4240 | 96% | — | — |
| Polyaluminium chloride | 0.62 | 263960 | 2780 | 97% | 270 | 9.7% |
| Polyaluminium chloride | 0.88 | 233270 | 2930 | 97% | — | — |
| Polyaluminium chloride | 1.05 | 187200 | 2290 | 98% | — | — |
| Polyaluminium chloride | 1.23 | 178340 | 1990 | 98% | 140 | 7.0% |

Preparation of a Second Batch of Microplastics Containing Secondary Wastewater Effluent, Matrix 3b:

MP1 was poured into a small beaker. From this beaker, 495 μL of the product was pipetted into a small beaker containing ultrapure water, and the pipette tip was flushed a few times. Then, this solution was poured into a 50 mL volumetric flask that was filled to the mark with ultrapure water (Millipore, Milli-Q, Q-POD). This solution was then poured into a sealable bottle to allow for pipetting under magnetic stirrer (during magnetic stirring). A magnet was added into the bottle, the bottle was placed on the magnetic stirrer and a stirring that allowed the overall solution to mix homogeneously with a small vortex was turned on. While stirring, 20 mL of this solution was pipetted into another sealable bottle containing 980 mL of ultrapure water, measured by (with) measuring glass, and the pipette tip was flushed a few times. Then, 500 mL of this solution was taken using a measuring glass and poured into a 10 L bucket. Then, 9500 mL of secondary wastewater treatment plant effluent was taken using a measuring glass and was added to the bucket.

1000 mL of a solution prepared in such a way was taken using a measuring glass and poured into 1 L beakers that were combined with Kemira flocculator as described above, and then used in the coagulation and flocculation experiments. The pH was adjusted to 6.6-6.9 in the experiments.

The used chemicals, dosages and results are shown in Table 11.

TABLE 11

The used chemicals, dosages and results in Matrix 3b.

| Treatment, chemical | Chemical dose, mmol Me/L | pH of experiment | Counts (all) | Counts (MP gate) | Removal % | Disturbing counts (MP gate) | Disturbing counts (MP gate)/Counts (MP gate), % |
|---|---|---|---|---|---|---|---|
| Zero | 0 | 6.6 | 1862900 | 109370 | 0% | — | — |
| Ferric sulphate | 0.07 | 6.8 | 1433880 | 80240 | 27% | — | — |
| Ferric sulphate | 0.16 | 6.7 | 879880 | 15900 | 85% | 70 | 0.4% |
| Ferric sulphate | 0.37 | 6.6 | 586210 | 870 | 99% | — | — |
| Ferric sulphate | 0.88 | 6.9 | 448300 | 250 | 100% | — | — |

Preparation of the Third Batch of Microplastics Containing Secondary Wastewater Effluent, Matrix 3c:

1000 mL of the secondary wastewater effluent was measured using a measuring glass and poured to 1 L beaker. MP3 was poured into a small beaker. From this beaker, 259 μL of the product was pipetted into the 1-L beaker containing effluent, and the pipette tip was flushed a few times. This was repeated for each sample, which were then combined with the Kemira flocculator as described above, and then used in the coagulation and flocculation experiments. The pH was adjusted to 6.6-6.9 in the experiments.

The used chemicals, dosages and results are shown in Table 12.

TABLE 12

The used chemicals, dosages and results in Matrix 3c.

| Treatment, chemical | Chemical dose, mmol Me/L | pH of experiment | Counts (all) | Counts (MP gate) | Removal % |
|---|---|---|---|---|---|
| Zero | 0 | 6.6 | 1669830 | 44800 | 0% |
| Polyaluminium chloride | 0.08 | 6.7 | 509160 | 4640 | 90% |
| Polyaluminium chloride | 0.16 | 6.7 | 230810 | 2530 | 94% |
| Polyaluminium chloride | 0.25 | 6.9 | 263910 | 8350 | 81% |
| Polyaluminium chloride | 0.37 | 6.8 | 170220 | 4180 | 91% |

Preparation of the Fourth Batch of Microplastics Containing Secondary Wastewater Effluent, Matrix 3d:

500 mL of ultrapure water (Millipore, Milli-Q, Q-POD) and 9500 mL of secondary wastewater treatment plant effluent were combined in a 10 L bucket. The solution was mixed, and approximately 100 mL of it was taken into a small beaker. MP5 was poured into a small beaker from which 3901 µL of the product was pipetted into the beaker containing the effluent-ultrapure water solution, and the pipette tip was flushed a few times. This mixture was then poured to a 1 L measuring glass, which was then filled with the effluent-ultrapure water solution and emptied to another 10 L bucket. 4100 mL of effluent-ultrapure solution was added, and the solution was mixed. 1000 mL of a solution prepared in such a way was taken using a measuring glass and poured into 1 L beakers which were combined with the Kemira flocculator as described above, and then used in the coagulation and flocculation experiments. pH was adjusted to 6.6-7.0 in the experiments.

The used chemicals, dosages and results are shown in Table 13.

TABLE 13

The used chemicals, dosages and results in Matrix 3d.

| Treatment, chemical | Chemical dose, mmol Me/L | pH of experiment | Counts (all) | Counts (MP gate) | Removal % |
|---|---|---|---|---|---|
| Zero | 0 | 6.8 | 1168070 | 6950 | 0% |
| Ferric chloride | 0.07 | 6.9 | 1164740 | 1110 | 84% |
| Ferric chloride | 0.16 | 6.8 | 632210 | 130 | 98% |
| Ferric chloride | 0.37 | 6.6 | 448350 | 50 | 99% |
| Ferric chloride | 0.88 | 7.0 | 346070 | 50 | 99% |

Other Factors Influencing the Needed Iron and Aluminium Dose:

The concentration of dissolved phosphorus that is bound in the phosphate (PO4-P) was low in the used secondary wastewater effluent. However, it can be higher in other waters that are treated and from which the microplastics are removed. The concentration of PO4-P influences the iron or aluminium dose. The higher the PO4-P concentration, the more iron or aluminium is consumed in removing the dissolved PO4-P from water. The typical iron or aluminium amount needed to remove PO4-P is 1.5 moles of iron or aluminium per mole of PO4-P (Me/P mol/mol). The potential influence of PO4-P of water from which the microplastics are removed on the required additional iron or aluminium dose, is shown in Table 14.

TABLE 14

Potential influence of $PO_4$—P of water on the required additional iron or aluminium dose that is needed on top of the dose needed to remove microplastics.

| Me/P, mol/mol | $PO_4$—P, mgP/L | Me requirement, mmol Me/L |
|---|---|---|
| 1.5 | 0.5 | 0.024 |
| 1.5 | 2 | 0.097 |
| 1.5 | 10 | 0.484 |

Also, the carbon and suspended solids content in the effluent consume iron and aluminium, and the higher these are, the higher dosage of iron or aluminium is needed.

Preparation of the First Batch of Microplastics Containing Secondary Wastewater Effluent, Matrix 3e:

MP1 was poured into a small beaker. From this beaker, 495 µL of the product was pipetted into a small beaker containing ultrapure water, and the pipette tip was flushed a few times. Then, this solution was poured into a 50-mL volumetric flask that was filled to the mark with ultrapure water (Millipore, Milli-Q, Q-POD). This solution was then poured into a sealable bottle to allow for pipetting during magnetic stirring (during magnetic stirring). A magnet was added into the bottle, the bottle was placed on the magnetic stirrer and a stirring that allowed the overall solution to mix homogeneously with a small vortex was turned on. While stirring, 20 mL of this solution was pipetted into a small beaker containing ultrapure water, and the pipette tip was flushed a few times. This solution was then poured into a 1-L volumetric flask which was filled to the mark with ultrapure water. Then, 500 mL of this solution was taken using a measuring glass and poured into a 10-L bucket. Then, 9500 mL of secondary wastewater treatment plant effluent was taken using a measuring glass and was added to the bucket.

1000 mL of a solution prepared in such a way was taken using a measuring glass and poured into 1-L beakers which were combined with the Kemira flocculator as described above, and then used in the coagulation and flocculation experiments. pH was adjusted to 7.2-7.3 in the experiments. The used chemicals, dosages and results of the experiments are shown in Table 15.

TABLE 15

The used chemicals, dosages, and results in Matrix 3e.

| Treatment, chemical | Chemical dose, mg/L | Counts (all) | Counts (MP gate) | Microplastics removal % | Disturbing counts (MP gate) | Disturbing counts (MP gate)/Counts (MP gate), % |
|---|---|---|---|---|---|---|
| Zero | 0 | 1623810 | 83740 | 0% | NA | NA |
| Superfloc C-577 | 34.8 | 496990 | 31660 | 62% | 910 | 3% |
| Superfloc C-577 | 37.7 | 638180 | 38400 | 54% | 890 | 2% |
| Superfloc C-577 | 40.6 | 956770 | 47090 | 44% | 890 | 2% |
| Superfloc C-577 | 46.4 | 1746620 | 59820 | 29% | NA | NA | d) Lake Water
Preparation of Microplastics Containing Lake Water (Matrix 4):

MP1 was poured into a small beaker. From this beaker, 495 μL of the product was pipetted into a small beaker containing ultrapure water, and the pipette tip was flushed a few times. Then, this solution was poured into a 50-mL volumetric flask that was filled to the mark with ultrapure water (Millipore, Milli-Q, Q-POD). This solution was then poured into a sealable bottle to allow for pipetting (during magnetic stirring). A magnet was added into the bottle, the bottle was placed on the magnetic stirrer and such a stirring was turned on that allowed the overall solution to mix homogeneously with a small vortex. While stirring, 20 mL of this solution was pipetted into another sealable bottle containing 980 mL of ultrapure water, measured by (with) measuring glass, and the pipette tip was flushed a few times. Then, 500 mL of this solution was taken using a measuring glass and poured into a 10 L bucket. Then, 9500 mL of lake water was taken using a measuring glass and was added to the bucket.

1000 mL of a solution prepared in such a way was taken using a measuring glass and poured into 1 L beakers which were combined with the Kemira flocculator as described above, and then used in the coagulation and flocculation experiments. pH was adjusted to 6.6-7.2 in the experiments.

The used chemicals, dosages and results are shown in Table 16.

TABLE 16

The used chemicals, dosages, and results in Matrix 4.

| Treatment, chemical | Chemical dose, mmol Me/L | pH in experiment | Counts (all) | Counts (MP gate) | Removal % |
|---|---|---|---|---|---|
| Zero | 0 | 7.2 | 674135 | 140325 | 0% |
| Polyaluminium chloride | 0.11 | 6.9 | 159855 | 5520 | 96% |
| Polyaluminium chloride | 0.14 | 6.8 | 122245 | 6620 | 95% |
| Polyaluminium chloride | 0.17 | 6.7 | 98875 | 5965 | 96% |
| Polyaluminium chloride | 0.20 | 6.6 | 92690 | 5610 | 96% |

Example 4. Removal of Microplastic Fibers from Water Matrix by Coagulation/Flocculation Using Ferric Chloride For preparing polyester (PES) fibers, fleece fabric was purchased from a fabric store, and the material was verified with FTIR spectroscopy. Fibers were prepared by brushing with a hard metal brush. The use of brush made the fibers pack tightly, which had adverse effect on dispersing fibers into water. Very intense packing was minimized by using very short strokes and removing fibers from the brush more often.

1.00 g of this way prepared fibers were mixed to total of 1000 mL of ultrapure water in a following way: the fiber amount was divided into two beakers with 450 mL of ultrapure water in each and dispersed using fast mixer (fast mixing). Then the beakers were combined, 100 mL of ultrapure water was added, and the solution was let to settle for approximately half an hour. This was done to exclude the fibers that had settled within this time frame, and to include mainly fibers that would not settle without chemical treatment. After the settling, the remaining fiber solution was pipetted, and several such batches were combined to one bucket. The settled and excluded fibers were weighed, and the dispersed fiber amount according to this was 0.0316 g. Then, 1.30 g CH3COONa and 2.20 g $NaHCO_3$ were added to the solution, that was then diluted to a volume of ten litres. This resulted in a fiber sample solution with a fiber concentration of 0.003 g/L. Then, the solution was homogenized mixing it slowly, and four 1 L samples were taken with a plastic jar and measuring glass. A coagulation/flocculation experiment was performed for these samples with FeCl3.

Figure 10:
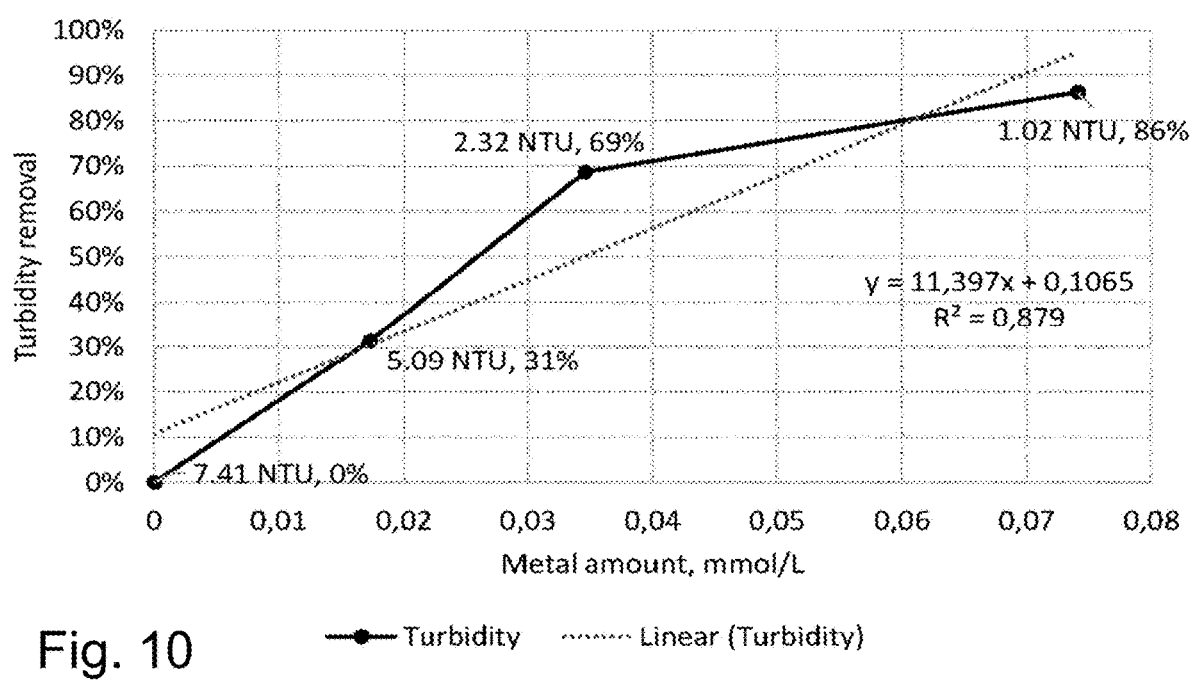
FIG. 10 shows turbidity removal of fiber samples after treatment with ferric chloride. Absolute turbidity with removal percentage next to each sample point.

The original turbidity in the sample solution was 12.2 NTU, that decreased to 7.4 NTU with the treatment without chemical. The turbidity was further decreased with increasing chemical dose (dosage) finally reaching 1.0 NTU. This indicates a 86% fiber removal when compared to the sample treated without chemical. The turbidity removal is shown in Table 17 and in FIG. 10.

TABLE 17

Used coagulant dosages and the treatment results in Matrix 1.

| Treatment | Chemical dose, mmol Me/L | Turbidity (NTU) | Microplastics removal % |
|---|---|---|---|
| Zero | 0 | 7.41 | 0% |
| Polyaluminium chloride | 0.017 | 5.09 | 31% |
| Polyaluminium chloride | 0.035 | 2.32 | 69% |
| Polyaluminium chloride | 0.074 | 1.02 | 86% |

The invention claimed is:
1. A method of monitoring and optionally controlling removal of microplastics from microplastic containing water selected from raw water, drinking water, storm water, water originating from melted snow, surface water, effluent of industrial wastewater treatment plants, effluent of municipal wastewater treatment plants, industrial process water, said method comprising the steps of:

admixing at least one coagulant and polymer to the microplastic containing water, and allowing the at least one coagulant and polymer to interact with the microplastic containing water to form flocs and/or aggregates containing microplastic particles; and removing the formed flocs and/or aggregates in a separation process to provide treated water with decreased microplastic content;

wherein the addition amount of said at least one coagulant and polymer is controlled in relation to a predetermined reference input value;

wherein the number of microplastic particles of the microplastic containing water before and/or after addition of said at least one coagulant and polymer is determined using an optical measurement method which measures light scattering and fluorescence of particles in a predetermined volume of the microplastic containing water, by:

a) measuring light scattering and fluorescence of particles in said predetermined volume of the microplastic containing water before and/or after addition of said at least one coagulant and polymer, b) measuring light scattering and fluorescence of particles in a predetermined volume of a reference water sample comprising microplastics, before and/or after addition of said at least one coagulant and polymer, wherein said reference water sample is doped with predetermined microplastics, c) combining the measured light scattering intensities and fluorescence intensities of each measurement in a) and b), d) identifying particle populations measured which represent microplastic particle populations, and e) determining the number of microplastic particles in the microplastic containing water before and/or after addition of said at least one coagulant and polymer, and further wherein:

(i) the size of the microplastic particles ranges from 0.1-100 µm;

(ii) the coagulant is added in an amount which results in a concentration of metal derived from the coagulant in the microplastic containing water which ranges from 0.01-1.5 mmol/l;

(iii) the amount of active polymer added to the water ranges from 0-50 mg/l; and (iv) the optical measurement is made using flow cytometry.

2. The method according to claim 1, wherein the number of microplastic particles is measured before and after the addition of said at least one coagulant and polymer.

3. The method according to claim 1, further including a concentration step before addition of said at least one coagulant and polymer to remove water and concentrate the water to be treated with said at least one coagulant and polymer.

4. The method according to claim 1, wherein the polymer is selected from the group consisting of anionic polymers, cationic polymers, non-ionic polymers, amphoteric polymers, polysaccharides, polyphenolic compounds, or any combination of the foregoing.

5. The method according to claim 4, wherein the polymer comprises at least one of:

an anionic polymer which comprises monomers selected from the group consisting of acrylamide (AMD), (2-acrylamido-2-methyl-1-propanesulfonic acid) (AMPS) and acrylic acid (AA) or any combination of the foregoing;

a cationic polymer which comprises cationic polyacrylamide, poly(diallyldimethylammonium chloride), polyamine, melamine-formaldehyde resin, polydicyandiamide, or any combination of the foregoing;

a nonionic polymer which comprises acrylamide (AMD) monomers;

a polysaccharide which comprises cellulose, starch, chitin and chitosan compounds, or any combination of the foregoing; and a polyphenolic which comprises tannin, lignin, or any combination of the foregoing.

6. The method according to claim 1, wherein the coagulant comprises an from inorganic coagulant.

7. The method according to claim 1, wherein the microplastics comprise polyethylene, polypropylene, polyvinylchloride, polyurethane, polystyrene, polyamide, polyester, acrylonitrile butadiene styrene, polytetrafluoroethylene, cellulose acetate, polycarbonate, polymethylmethacrylate, polyethylene terephthalate, polyvinylidene chloride, phenol formaldehyde, melamine formaldehyde and/or any derivative of the foregoing.

8. The method according to claim 1, wherein the separation of the formed flocs and/or aggregates from the microplastic containing water and/or substantially purified water is performed by one or more of sedimentation, filtration, flotation, froth flotation, dissolved air flotation, or any combination thereof.

9. The method according to claim 1, wherein the microplastic containing water or treated water, prior to the optical measurement is provided with a fluorescent dye which selective stains microplastics.

10. The method according to claim 1, wherein said predetermined reference input value is set to reflect a specific measured value of the number of microplastic particles; or is set to reflect a specific measured decrease of the number of microplastic particles.

11. The method according to claim 1, wherein a control unit is used in the method, said control unit having a database, a file, a data processor for receiving measured data and converting the received data on light scattering intensities and fluorescence intensities before and/or after addition of said at least one coagulant and polymer, and based on at least said predetermined reference input value, determining whether to increase, decrease, or maintain the added amount of said at least one coagulant and polymer during the method.

12. The method according to claim 6, wherein the coagulant comprises an inorganic coagulant which comprises an iron containing salt, an aluminium containing salt, a magnesium containing salt, or comprises a derivative of any of the foregoing.

13. The method according to claim 12, wherein the inorganic coagulant is selected from chlorides, sulphates, chlorosulphates, chlorohydrates, silicates, nitrates, and derivatives of any of the foregoing.

14. The method according to claim 13, wherein the inorganic coagulant is selected from the group consisting of aluminium sulfate, polyaluminium sulfate, aluminium chloride, polyaluminium chloride, polyaluminium chlorosulfate, polyaluminium hydroxychlorosulfate, aluminium chlorohydrate, sodium aluminate, ferric sulfate, polyferric sulfate, ferric chloride, ferric chlorosulphate, polyferric chloride, ferrous sulfate, ferrous chlorosulphate, ferrous chloride, aluminium triformate, polyaluminium formate, polyaluminium nitrate, polyaluminium silicate, magnesium chloride, derivatives thereof, and any combination of the foregoing.

\* \* \* \* \*